United States Patent
Woo et al.

(10) Patent No.: US 11,673,543 B2
(45) Date of Patent: Jun. 13, 2023

(54) VEHICLE CONTROL SYSTEM AND VEHICLE CONTROL METHOD

(71) Applicant: MANDO CORPORATION, Pyeongtaek-si (KR)

(72) Inventors: Hyeong Min Woo, Seongnam-si (KR); Jae Suk Kim, Yongin-si (KR)

(73) Assignee: HL KLEMOVE CORP., Incheon (KR)

(*) Notice: Subject to any disclaimer, the term of this patent is extended or adjusted under 35 U.S.C. 154(b) by 393 days.

(21) Appl. No.: 16/654,146

(22) Filed: Oct. 16, 2019

(65) Prior Publication Data

US 2020/0114906 A1 Apr. 16, 2020

(30) Foreign Application Priority Data

Oct. 16, 2018 (KR) .......................... 10-2018-0123221

(51) Int. Cl.
*B60W 30/06* (2006.01)
*G05D 1/00* (2006.01)
*G05D 1/02* (2020.01)

(52) U.S. Cl.
CPC ........... *B60W 30/06* (2013.01); *G05D 1/0016* (2013.01); *G05D 1/0088* (2013.01); *G05D 1/0246* (2013.01); *B60W 2420/42* (2013.01); *G05D 2201/0213* (2013.01)

(58) Field of Classification Search
CPC .............. B60W 30/06; B60W 2420/42; G05D 1/0088; G05D 1/0016; G05D 1/0246; G05D 2201/0213
See application file for complete search history.

(56) References Cited

U.S. PATENT DOCUMENTS

| | | | |
|---|---|---|---|
| 9,910,437 B2* | 3/2018 | Nordbruch | G01C 21/36 |
| 9,947,223 B2* | 4/2018 | Mielenz | G05D 1/0282 |
| 9,990,849 B2* | 6/2018 | Mielenz | B62D 15/0285 |

(Continued)

FOREIGN PATENT DOCUMENTS

| | | | | |
|---|---|---|---|---|
| DE | 102015201204 A1 * | 7/2016 | | B62D 15/0285 |
| DE | 102016100730 A1 * | 7/2017 | | G08G 1/146 |

(Continued)

OTHER PUBLICATIONS

"Fiducial Marker Indoor Localization with Artificial Neural Network" G. Kim and E. Petriu, 2010 IEEE/ASME International Conference on Advanced Intelligent Mechatronics Montreal, Canada, Jul. 6-9, 2010 (Year: 2010).*

(Continued)

*Primary Examiner* — Peter D Nolan
*Assistant Examiner* — Tanya C Sienko
(74) *Attorney, Agent, or Firm* — Hauptman Ham, LLP

(57) ABSTRACT

Provided are a vehicle control system and a vehicle control method, the vehicle control system including one or more image sensors disposed on a vehicle to have a field of view of an outside of the vehicle and configured to capture image data, a processor configured to process the image data captured by the image sensor, and a controller configured to set a travelling route from an alighting infrastructure to a parking infrastructure based at least in part on processing of the image data, and control the vehicle stopped in the alighting infrastructure to travel along the travelling route and to be parked in the parking infrastructure.

16 Claims, 9 Drawing Sheets

(56) References Cited

U.S. PATENT DOCUMENTS

| | | | | |
|---|---|---|---|---|
| 10,008,120 | B2* | 6/2018 | Nordbruch | G08G 1/146 |
| 10,011,274 | B2* | 7/2018 | Holland-Letz | B60W 10/20 |
| 10,019,899 | B2* | 7/2018 | Nordbruch | H04W 4/029 |
| 10,048,698 | B2* | 8/2018 | Nordbruch | G05D 1/0276 |
| 10,059,332 | B2* | 8/2018 | Blott | G05D 1/0255 |
| 10,062,283 | B2* | 8/2018 | Mielenz | G08G 1/146 |
| 10,388,164 | B2* | 8/2019 | Lehn | G08G 1/096811 |
| 10,392,825 | B2* | 8/2019 | Scherer | G05D 1/0282 |
| 10,395,563 | B2* | 8/2019 | Nordbruch | G01C 21/3667 |
| 10,429,837 | B2* | 10/2019 | Nordbruch | G05D 1/0022 |
| 10,446,029 | B2* | 10/2019 | Hoffmann | G08G 1/096811 |
| 10,467,481 | B2* | 11/2019 | Cortelyou | G06V 10/245 |
| 10,474,156 | B2* | 11/2019 | Nordbruch | G08G 1/14 |
| 10,496,092 | B2* | 12/2019 | Nordbruch | G08G 1/168 |
| 10,597,080 | B2* | 3/2020 | Nordbruch | B62D 15/0285 |
| 10,655,972 | B2* | 5/2020 | Nordbruch | G01C 21/32 |
| 10,665,101 | B2* | 5/2020 | Nordbruch | G08G 1/143 |
| 10,689,875 | B2* | 6/2020 | Maier | E04H 6/424 |
| 10,713,949 | B2* | 7/2020 | Nordbruch | G08G 1/146 |
| 10,793,142 | B2* | 10/2020 | Nordbruch | G08G 1/143 |
| 10,829,154 | B2* | 11/2020 | Irion | G05D 1/0248 |
| 10,839,686 | B2* | 11/2020 | Wunder | G06Q 50/10 |
| 10,867,514 | B2* | 12/2020 | Nordbruch | G01C 21/3407 |
| 10,914,594 | B2* | 2/2021 | Mielenz | G05D 1/0278 |
| 11,100,433 | B2* | 8/2021 | Voelz | B60W 30/06 |
| 2011/0010023 | A1* | 1/2011 | Kunzig | G01C 21/206 701/2 |
| 2016/0318523 | A1* | 11/2016 | Kim | B60R 1/00 |
| 2017/0067433 | A1* | 3/2017 | Ahn | F02N 11/0818 |
| 2017/0313306 | A1* | 11/2017 | Nordbruch | G05D 1/0011 |
| 2017/0351267 | A1* | 12/2017 | Mielenz | G06T 7/70 |
| 2018/0095474 | A1* | 4/2018 | Batur | G01S 19/48 |
| 2018/0122245 | A1* | 5/2018 | Penilla | G06Q 30/0643 |
| 2018/0186407 | A1* | 7/2018 | Kim | B62D 15/0285 |
| 2018/0224865 | A1* | 8/2018 | Quast | G05D 1/0282 |
| 2018/0233033 | A1* | 8/2018 | Nordbruch | G08G 1/04 |
| 2018/0236993 | A1* | 8/2018 | Mielenz | G08G 1/146 |
| 2018/0246515 | A1* | 8/2018 | Iwama | G05D 1/0221 |
| 2019/0012916 | A1* | 1/2019 | Nordbruch | G08G 1/142 |
| 2019/0184982 | A1 | 6/2019 | Latotzki | |
| 2019/0186450 | A1* | 6/2019 | Bang | F02D 41/0225 |
| 2020/0282974 | A1* | 9/2020 | Diessner | G05D 1/0246 |
| 2021/0309212 | A1* | 10/2021 | Sonalker | G01C 21/3685 |

FOREIGN PATENT DOCUMENTS

| | | | | |
|---|---|---|---|---|
| EP | | 3333049 A1 * | 6/2018 | B62D 15/0285 |
| KR | 10-2019-0098818 A | | 8/2019 | |

OTHER PUBLICATIONS

"5-DoF Monocular Visual Localization Over Grid Based Floor" by M.Das et al. 2017 International Conference on Indoor Positioning and Indoor Navigation, Sep. 18-21, 2017, Sapporo, Japan (Year: 2017).*

"Realizing Autonomous Valet Parking with Automotive Grade Sensors" by P. Jeevan et al., IEEE/PSJ International Conference on Intelligent Robots and Systems Oct. 1-22, 2010, Taipei, Taiwan (Year: 2010).*

"Robust Automatic Parking without Odometry using Enhanced Fuzzy Logic Controller" Y. Ryu et al., 2006 IEEE International Conference on Fuzzy Systems Jul. 16-21, 2006 pp. 521-527 (Year: 2006).*

* cited by examiner

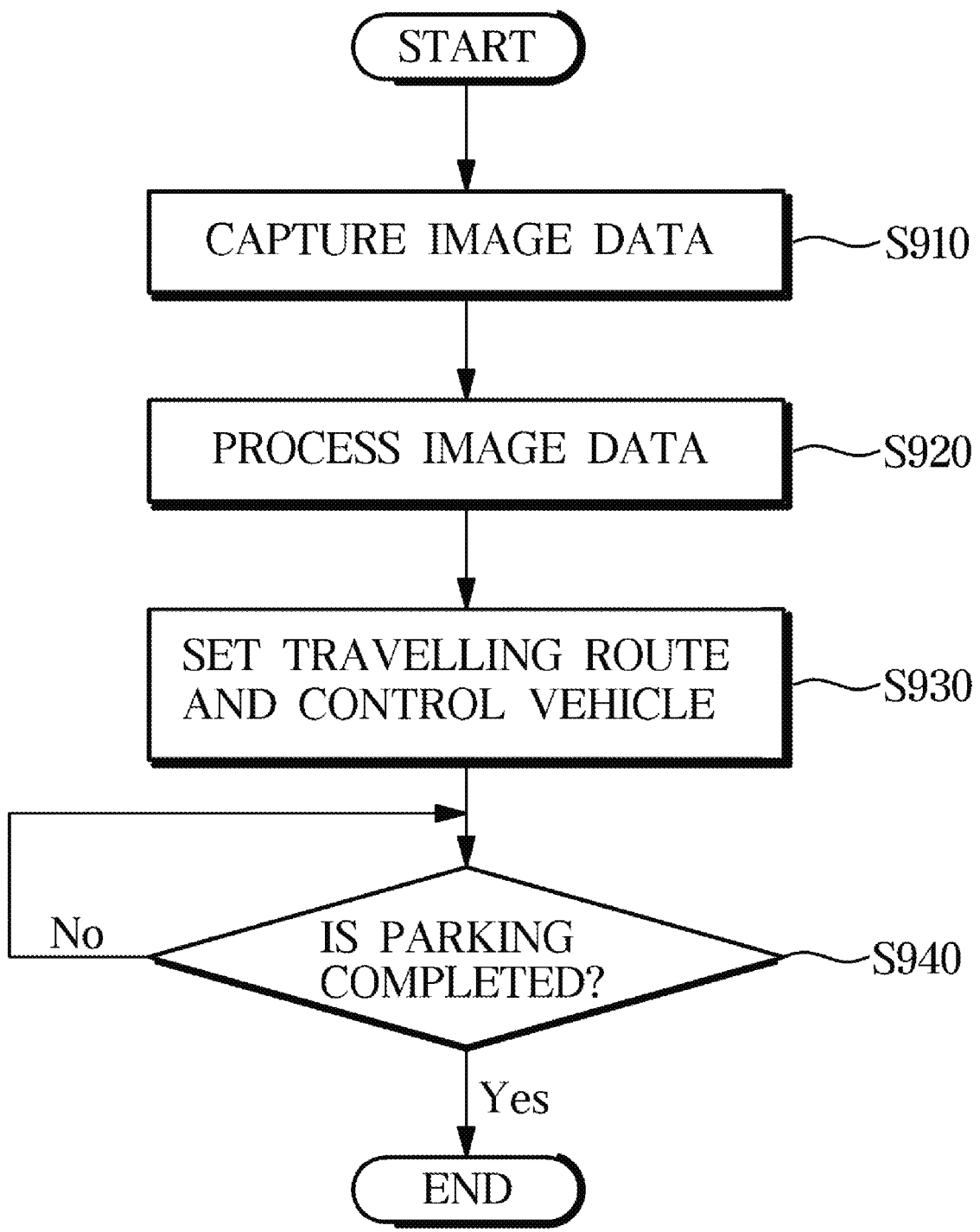

VEHICLE CONTROL SYSTEM AND VEHICLE CONTROL METHOD

CROSS-REFERENCE TO RELATED APPLICATION

This application is based on and claims priority under 35 U.S.C. § 119 to Korean Patent Application No. 10-2018-0123221, filed on Oct. 16, 2018 in the Korean Intellectual Property Office, the disclosure of which is incorporated herein by reference.

BACKGROUND

1. Field

The present disclosure relates to a vehicle control system and a vehicle control method.

2. Description of the Related Art

Recently, vehicle performance and convenience have been of interest to the consumers. As the demand for vehicle performance, driver comfort and safety increases, research and development are been consistently undertaken on Advanced Driver Assist System (ADAS), which controls the vehicle to assist the driver in driving the vehicle.

In particular, since novice drivers and the elderly generally have difficulty in parking, smart parking assist system (SPAS) allows the driver to park more easily. SPAS refers to a system in which a vehicle moving at a low speed searches a parking space through sensors mounted on the vehicle, calculates a trajectory to park the vehicle in the found parking space, and guides the driver to stop the vehicle.

However, since the above-described SPAS searches the parking space only by slowly moving the vehicle, the searching requires considerable time, and due to the limited trajectory and travelling route for parking in the parking space, the SPAS requires a driver's intervention eventually, which causes inconvenience to the driver.

Accordingly, there is a need for a technology for searching a travelling route from a current vehicle position to a parking zone without moving the vehicle and controlling the vehicle to autonomously travel to be parked in the parking zone without a driver's intervention.

SUMMARY

Therefore, it is an object of the present disclosure to provide a vehicle control system capable of providing a driver with a convenience of driving by controlling the vehicle to be autonomously parked, and a vehicle control method thereof.

It is another object of the present disclosure to provide a vehicle control system capable of setting a travelling route that enables accurate parking in a parking zone or an exit route that enables accurately arrival at an exit zone, and a vehicle control method thereof.

Additional aspects of the disclosure will be set forth in part in the description which follows and, in part, will be obvious from the description, or may be learned by practice of the disclosure.

In accordance with one aspect of the present disclosure, a vehicle control system includes: one or more image sensors disposed on a vehicle to have a field of view of an outside of the vehicle and configured to capture image data; a processor configured to process the image data captured by the image sensor; and a controller configured to set a travelling route from an alighting infrastructure to a parking infrastructure based at least in part on processing of the image data, and control the vehicle stopped in the alighting infrastructure to travel along the travelling route and to be parked in the parking infrastructure, wherein the controller is configured to: determine position coordinates and a type of stop of the vehicle in the alighting infrastructure based on a result of the processing of the image data and previously stored alighting infrastructure information; extract position coordinates of the parking infrastructure based on previously stored parking infrastructure information; set the travelling route using the position coordinates of the vehicle and the position coordinates of the parking infrastructure; and determine an initial behavior for a start of the stopped vehicle based on the type of stop of the vehicle.

In accordance with another aspect of the present disclosure, a vehicle control system includes: one or more image sensors disposed on a vehicle to have a field of view of an outside of the vehicle and configured to capture image data; a smart parking assist system (SPAS) module configured to search a parking space existing around the vehicle and controlling a behavior of the vehicle such that the vehicle is parked in the parking space or the vehicle parked in the parking space is unparked; and a domain control unit (DCU) configured to process the image data captured by the image sensor and control at least one driver assistance system provided in the vehicle and including the SPAS module, wherein the DCU is configured to: determine position coordinates and a type of stop of the vehicle in an alighting infrastructure based on a result of processing of the image data and previously stored alighting infrastructure information; extract position coordinates of a parking infrastructure based on previously stored parking infrastructure information; set a travelling route using the position coordinates of the vehicle and the position coordinates of the parking infrastructure; and determine an initial behavior for a start of the stopped vehicle based on the type of stop of the vehicle.

In accordance with another aspect of the present disclosure, an image sensor disposed on a vehicle to have a field of view of an outside of the vehicle and configured to capture image data is characterized in that: the image data is processed by a processor and is used to determine position coordinates and a type of stop of the vehicle in an alighting infrastructure; and the position coordinates of the vehicle is used to set a travelling route together with position coordinates of a parking infrastructure that are extracted from previously stored parking infrastructure information.

In accordance with another aspect of the present disclosure, a vehicle control method includes: capturing image data using one or more image sensor disposed on a vehicle to have a field of view of an outside of the vehicle; processing the image data captured by the image sensor; and setting a travelling route from an alighting infrastructure to a parking infrastructure based at least in part on processing of the image data, and controlling the vehicle stopped in the alighting infrastructure to travel along the travelling route and to be parked in the parking infrastructure, wherein the controlling of the vehicle to be parked in the parking infrastructure includes: determining position coordinates and a type of stop of the vehicle in the alighting infrastructure based on a result of processing of the image data and previously stored alighting infrastructure information; extracting position coordinates of the parking infrastructure based on previously stored parking infrastructure information; setting the travelling route using the position coordinates of the vehicle and the position coordinates of the parking infrastructure;

and determining an initial behavior for a start of the stopped vehicle based on the type of stop of the vehicle.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 9 is a flowchart showing a vehicle control method according to the present disclosure.

DETAILED DESCRIPTION

Hereinafter, the exemplary embodiment of the present disclosure will be described with reference to the accompanying drawings in detail. Although the terms "first," "second," "A," "B," "(a)", "(b)", etc. may be used to describe various components, the terms do not limit the corresponding components and the order or sequence thereof, but are used only for the purpose of distinguishing one component from another component. It will be understood that when an element is referred to as being "connected" or "coupled" to another element, it may be directly connected or coupled to the other element or intervening elements may be present.

Figure 1:
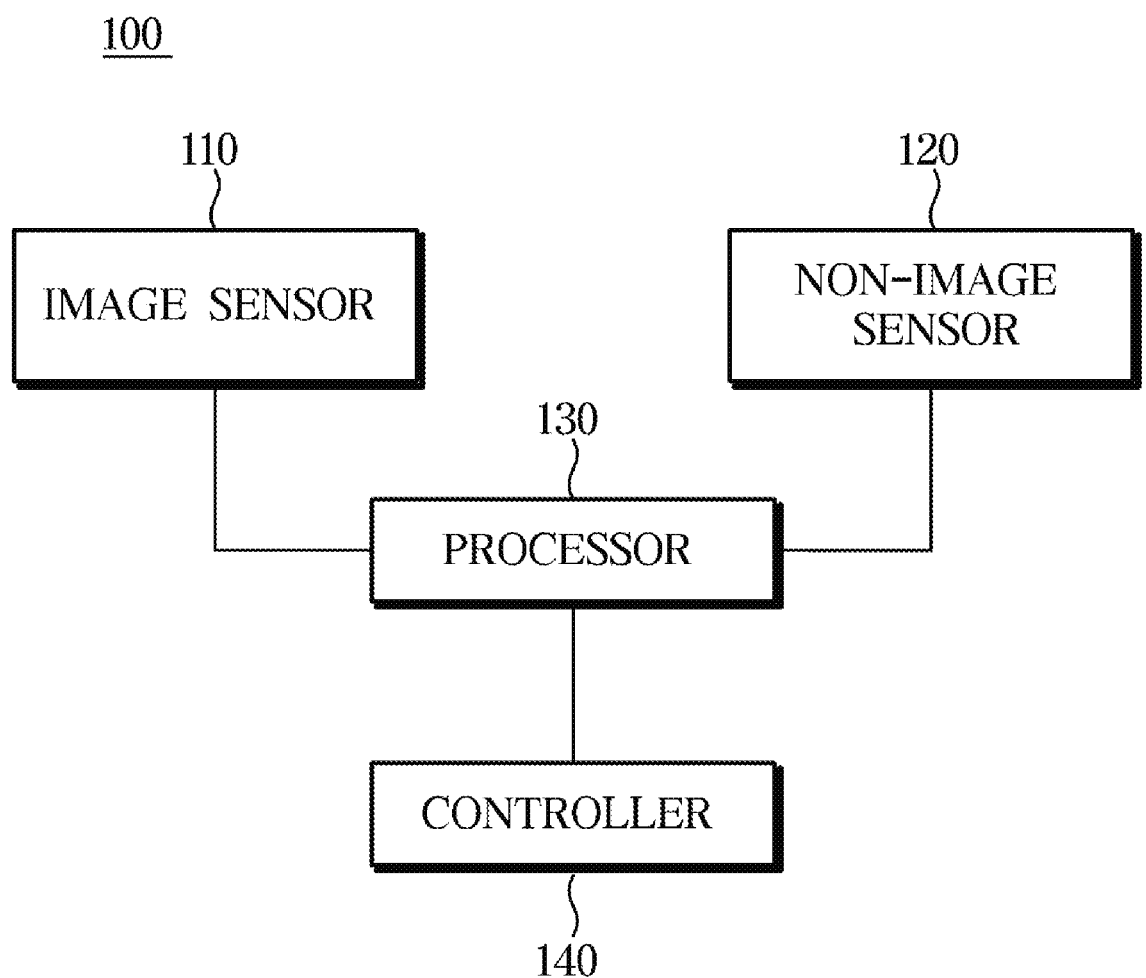
FIG. 1 is a view illustrating a vehicle control system according to the present disclosure.

FIG. 1 is a view illustrating a vehicle control system 100 according to the present disclosure.

Referring to FIG. 1, a vehicle according to the present disclosure may execute the vehicle control system 100. The vehicle control system 100 may include an image sensor 110, a non-image sensor 120, a processor 130, a controller 140, and the like.

The image sensor 110 may be disposed on the vehicle to have a field of view of the outside of the vehicle, and configured to capture image data.

The image sensor 110 may be provided in one or more units thereof, and mounted on each part of the vehicle to have a field of view of the front side, lateral side, or rear side of the vehicle.

Since image information photographed by the image sensor 110 is composed of image data, the image information may refer to image data captured by the image sensor 110. In the present disclosure, image information photographed by the image sensor 110 refers to image data captured by the image sensor 110.

The image data captured by the image sensor 110 may be generated, for example, in any form of raw AVI, MPEG-4, H.264, DivX, and JPEG. The image data captured by the image sensor 110 may be processed by the processor 130.

The non-image sensor 120 may be disposed on the vehicle to have a field of sensing of the outside of the vehicle and configured to capture sensing data.

The non-image sensor 120 may be provided in at least one unit thereof, and examples of the non-image sensor 120 may include a radar, a lidar, an ultrasonic sensor, and the like.

The sensing data captured by the non-image sensor 120 may be processed by the processor 130.

The processor 130 may be configured to process at least one of image data captured by the image sensor 110 and sensing data captured by the non-image 120, and may be provided in at least one unit thereof.

That is, the processor 130 may be configured to process image data captured by the image sensor 110 and sensing data captured by the non-image sensor 120, and may be provided in a plurality of units thereof to process image data and sensing data.

The controller 140 may set a travelling route from an alighting infrastructure (Infra) to a parking infrastructure (Infra) based at least in part on the processing of the image data, and control the vehicle stopped in the alighting infrastructure to travel along the travelling route and to be parked in the parking infrastructure.

Specifically, the controller 140 may determine position coordinates and a type of stop of the vehicle in the alighting infrastructure on the basis of a result of processing of the image data and previously stored alighting infrastructure information, extract position coordinates of the parking infrastructure on the basis of previously stored parking infrastructure information, set a travelling route using the position coordinates of the vehicle and the position coordinates of the parking infrastructure, and determine an initial behavior for a start of the stopped vehicle on the basis of the type of stop of the vehicle.

Here, the alighting infrastructure (Infra) may refer to a structure having a certain alighting zone such that the vehicle enters the alighting infrastructure and makes a stop. When the vehicle entering the alighting infrastructure is stopped, the driver in the vehicle may alight the vehicle.

In the alighting zone of the alighting infrastructure, grid lines may be marked. When the grid lines are marked in the alighting zone, the position coordinates of the vehicle may be more accurately determined by the grid lines.

Here, the alighting infrastructure information refers to information about the alighting infrastructure. Specifically, the alighting infrastructure information may include a plurality of grid lines, a size and form of the alighting infrastructure, position coordinates of the alighting infrastructure, and the like.

Here, the parking infrastructure (Infra) may refer to a structure having a certain parking zone. The parking zone of the parking infrastructure may be marked with grid lines. When the grid lines are marked in the parking zone, the position coordinates of the vehicle may be determined more accurately by the grid lines.

Here, the parking infrastructure information refers to information about the parking infrastructure, and specifically, the parking infrastructure information may include a plurality of grid lines, a size and form of the parking infrastructure, position coordinates of the parking infrastructure, and the like.

The alighting infrastructure information and the parking infrastructure information may be stored in advance, by a driver in a vehicle, or by design and experimental values. When the alighting infrastructure information and the parking infrastructure information are stored by the driver, the information may be updated each time. However, the storing of the alighting infrastructure information and the parking infrastructure information is not limited thereto. To this end, the controller 140 may further include a memory for storing the above-described alighting infrastructure information, parking infrastructure information, and the like.

Here, the type of stop of a vehicle may refer to the form of a vehicle stopped in the alighting infrastructure. The type of stop is, for example, a longitudinal stop in which the vehicle is stopped in the longitudinal direction, a traverse stop in which the vehicle is stopped in the traverse direction, an oblique stop in which the vehicle is stopped at a predetermined angle with respect to the alighting infrastructure, and the like. However, the type of stop of the vehicle is not limited thereto. Here, the longitudinal stop and the traverse stop may be a relative concept determined according to a specific criterion.

Here, the initial behavior may refer to a movement when the vehicle positioned in the alighting infrastructure first starts travelling. The initial behavior represents the steering angle of the vehicle, the degree of acceleration, the head lamp, the back-up lamp, the turn signal lamp, and the like, but the present disclosure is not limited thereto.

The initial behavior when the vehicle 210 first starts travelling, in particular, the steering angle may be determined according to the type of stop of the vehicle 210 stopped in the alighting infrastructure 220.

The controller 140 may determine the above-described position coordinates and type of stop of the vehicle based in part on the processing of the sensing data instead of the image data, set a travelling route according to the position coordinates and type of stop of the vehicle, and control the vehicle to travel along the travelling route and to be parked in the parking infrastructure In addition, the controller 140 may determine the position coordinates and the type of stop of the vehicle in the same manner as described above based on the processing result of each of the image data and the sensing data.

The controller 140 may be implemented using an electronic controller unit (ECU), a micro controller unit (MCU), or the like.

Meanwhile, the controller 140 may be implemented using a domain control unit (DCU) configured to perform the function of the processor 130, the above described operation of the controller 140, and the function of performing output to a steering control module, a brake control mode, an adaptive driving assistance system (ADAS) module, and the like to control the vehicle.

The ADAS module may refer to various driver assistance systems implemented in a module, and the driver assistance systems may include a smart parking assistance system (SPAS), a blind spot detection (BSD) system, an adaptive cruise control (ACC) system, a lane departure warning system (LDWS), a lane keeping assist system (LKAS), a lane change assist system (LCAS), and the like, but the implementation of the ADAS module is not limited thereto.

An embodiment of the vehicle control system 100 that operates using the DCU capable of performing all the functions of the processor 130 and the controller 140 described above may include one or more image sensors 110 disposed on the vehicle to have a field of view of the outside of the vehicle and configured to capture image data, a SPAS module configured to search a parking space existing around the vehicle and control the behavior of the vehicle such that the vehicle is parked in the parking space or the vehicle parked in the parking space is unparked, and a DCU configured to process the image data captured by the image sensor 110 and control at least one driver assistance system provided in the vehicle including the SPAS.

Here, the DCU determines the position coordinates and the type of stop of the vehicle in the alighting infrastructure based on the processing result of the image data and the previously stored alighting infrastructure information, extracts the position coordinates of the parking infrastructure based on the previously stored parking infrastructure information, sets the travelling route using the position coordinates of the vehicle and the position coordinates of the parking infrastructure, and determines the initial behavior when the stopped vehicle starts based on the type of stop of the vehicle in the same manner of the controller 140 described above.

Figure 2:
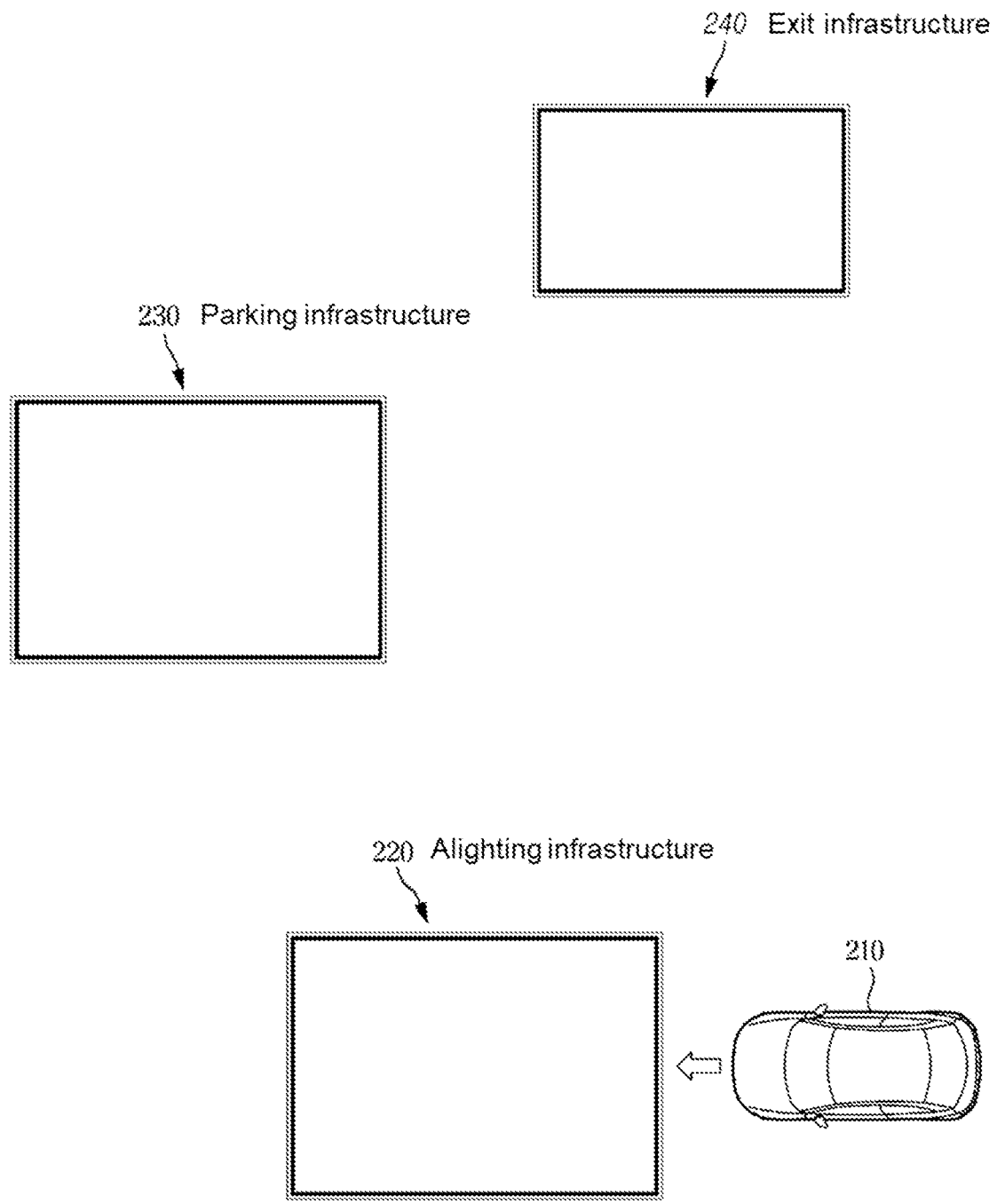
FIG. 2 is a view illustrating a vehicle and an infrastructure according to the present disclosure.

FIG. 2 is a view illustrating a vehicle 210 and infrastructures 220, 230, and 240 according to the present disclosure. Referring to FIG. 2, a driver in the vehicle 210 according to the present disclosure may drive the vehicle 210 to enter the alighting infrastructure 220.

When the vehicle 210 enters the alighting infrastructure 220 to be positioned in the alighting infrastructure 220, the driver in the vehicle 210 may alight the vehicle 210 and transmit a travelling command signal using a wireless communication terminal.

Here, the wireless communication terminal refers to all types of devices capable of performing wireless communication, such as a smart phone, a smart key, and the like. The travelling command signal refers to a signal that instructs the vehicle 210 positioned in the alighting infrastructure 220 to travel and be parked in the parking infrastructure 230.

Although not shown, a communication device, for example, a set-top box, capable of communicating with the vehicle 210 may be disposed in the vicinity of the alighting infrastructure 220, and a communication device, for example, a beacon, capable of communicating with the vehicle 210 may be disposed in the vicinity of the parking infrastructure 230.

When the vehicle 210 receives the travelling command signal, the vehicle 210 autonomously travels along the travelling route set from the alighting infrastructure 220 to the parking infrastructure 230 and is parked in the parking infrastructure 230.

For example, in response to receiving the travelling command signal from the wireless communication terminal, the controller 140 controls the vehicle 210 to travel along the travelling route.

On the other hand, in a state in which the vehicle 210 is parked in the parking infrastructure 230, the driver may transmit an exit command signal using the wireless communication terminal.

Here, the exit command signal refers to a signal for instructing the vehicle 210 positioned in the parking infrastructure 230 to exit from the parking infrastructure 230 and be positioned in the exit infrastructure 240.

Here, the exit infrastructure 240 is a structure having a certain exit zone such that the parked vehicle 210 exits from the parking space and allows the driver to board the vehicle. Although the exit infrastructure 240 is illustrated as a separate structure located at a place different from a place where the alighting infrastructure 220 is located in FIG. 2, the exit infrastructure 240 may be the same structure as the alighting infrastructure 220. In addition, the exit infrastructure 240 may be provided in various forms.

When the vehicle 210 receives the exit command signal, the vehicle 210 autonomously travels along an exit route set from the parking infrastructure 230 to the exit infrastructure 240 to reach the exit infrastructure 240.

The travelling route according to the present disclosure is set using the position coordinates of the vehicle 210 in the alighting infrastructure 220, and the exit route according to the present disclosure is set using the position coordinates of the vehicle 210 in the parking infrastructure 230.

Hereinafter, an embodiment of determining the position coordinates of the vehicle 210 in the alighting infrastructure 220 will be described in detail.

Figure 3:
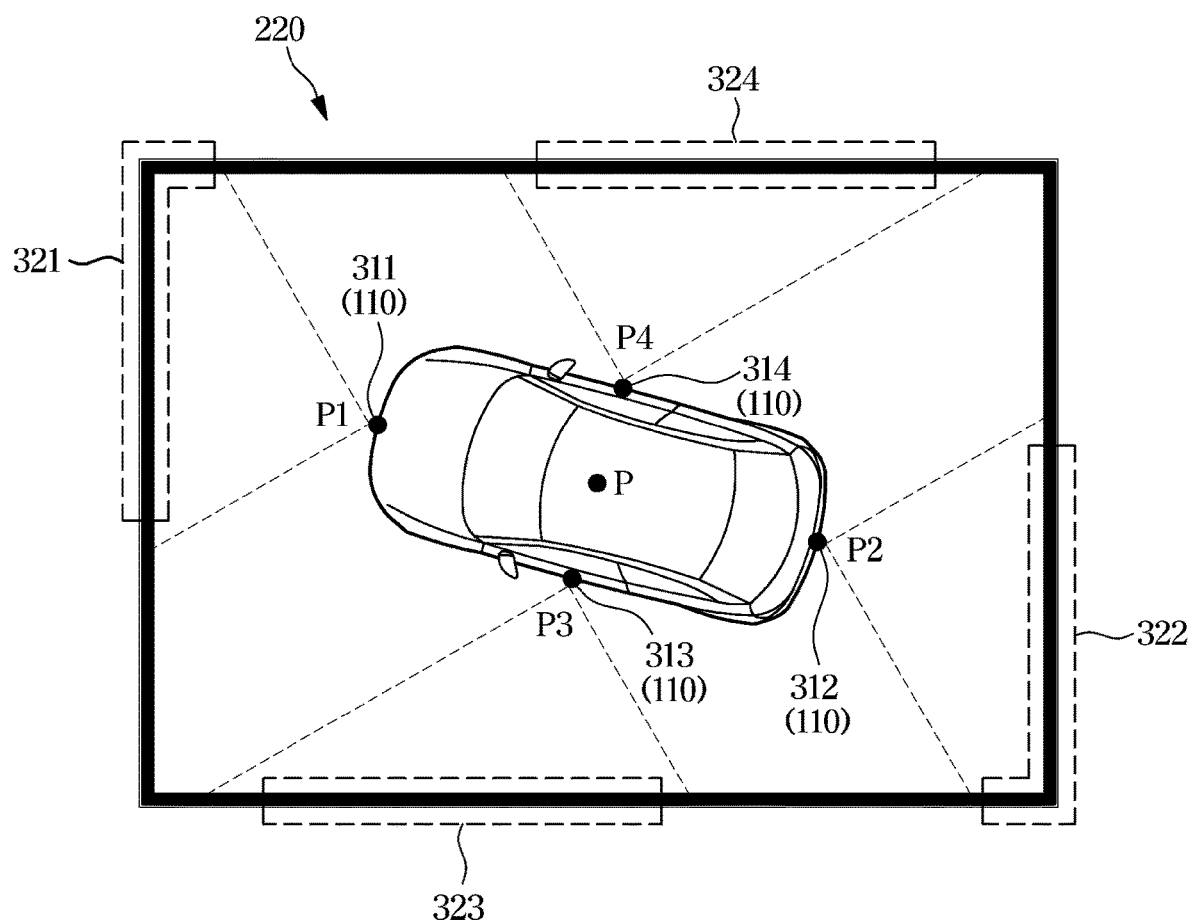
FIG. 3 is a view for describing an embodiment of determining the position coordinates of a vehicle positioned in an alighting infrastructure according to the present disclosure.

FIG. 3 is a view for describing an embodiment of determining the position coordinates of the vehicle 210 positioned in the alighting infrastructure 220 according to the present disclosure.

Referring to FIG. 3, when the vehicle 210 according to the present disclosure is positioned in the alighting infrastructure 220, the position coordinates of the vehicle 210 in the alighting infrastructure 220 may be determined using a plurality of image sensors 110 disposed on the vehicle 210 and previously stored alighting infrastructure information.

Specifically, the image sensor 110 is provided in one or more units thereof on each of a front part, a rear part, and a lateral part of the vehicle 210 to have a respective field of view of a front side, a rear side, and a lateral side of the vehicle.

In addition, the alighting infrastructure information includes a size and a shape of the alighting infrastructure 220. Here, the size of the alighting infrastructure 220 may include a longitudinal length, a transverse length, and the like, of the alighting infrastructure 220, and the shape of the alighting infrastructure 220 may refer to a square shape, a circular shape, or the like. However, the alighting infrastructure information is not limited thereto.

In addition, the controller 140 estimates a plurality of coordinates using results of processing of a plurality of pieces of image data obtained by capturing a front area, a rear area, and a lateral area of the vehicle 210 and the size and shape of the alighting infrastructure 220, calculates center coordinates of the vehicle 210 using the estimated plurality of coordinates and determines the center coordinates to be the position coordinates of the vehicle 210.

Here, the lateral side may include a first lateral side 313, for example, a left side of the vehicle 210 and a second lateral side 314, for example, a right side of the vehicle 210. However, the lateral side is not limited thereto.

More specifically, referring to FIG. 3, the image sensor 110 is provided in one or more units thereof on each of a front part 311, a rear part 312, a first lateral part 313, and a second lateral part 314 of the vehicle 210 to have a respective field of view of a front side, a rear side, a first lateral side, and a second lateral side of the vehicle 210. Here, the arrangement of the image sensor 110 should be regarded as illustrative to aid in the understanding of the disclosure, and is not limited to FIG. 3.

In addition, the controller 140, by using a first part 321 of the alighting infrastructure 220 resulting from processing first image data obtained by capturing the front area of the vehicle 210, calculates the degree of distortion of the first part 321, the distance between the first part 321 and the front part 311 of the vehicle 210, and the like. Thereafter, the controller 140 estimates first coordinates P1 by matching the degree of distortion of the first part 321, the distance between the first part 321 and the front part 311 of the vehicle 210 with the size and shape of the alighting infrastructure 220 included in the alighting infrastructure information.

Similarly, the controller 140, by using a second part 322 of the alighting infrastructure 220 resulting from processing second image data obtained by capturing the rear area of the vehicle 210, calculates the degree of distortion of the second part 322, the distance between the second part 322 and the rear part 312 of the vehicle 210, and the like. Thereafter, the controller 140 estimates second coordinates P2 by matching the degree of distortion of the second part 322, the distance between the second part 322 and the rear part 312 of the vehicle 210 with the size and shape of the alighting infrastructure 220 included in the alighting infrastructure information.

Similarly, the controller 140 estimates third coordinates P3 using a third part 323 of the alighting infrastructure 220, which results from processing third image data obtained by capturing the first lateral area 313 of the vehicle 210, and the size and shape of the alighting infrastructure 220, and the controller 140 estimates fourth coordinates P4 using a fourth part 324 of the alighting infrastructure 220, which results from processing fourth image data obtained by capturing the second lateral area 314 of the vehicle 210, and the size and shape of the alighting infrastructure 220.

The controller 140 calculates the center coordinates P of the vehicle 210 using the estimated first coordinates P1, second coordinates P2, third coordinates P3, and fourth coordinate P4, and determines the center coordinates P to be the position coordinates of the vehicle 210.

Although the above-described embodiment has been described using the image sensor 110, the embodiment may be implemented in the same manner using the non-image sensor 120.

In addition, the above-described embodiment may be implemented in the same manner using a DCU having a combination of the processor 130 and the controller 140.

Figure 4:
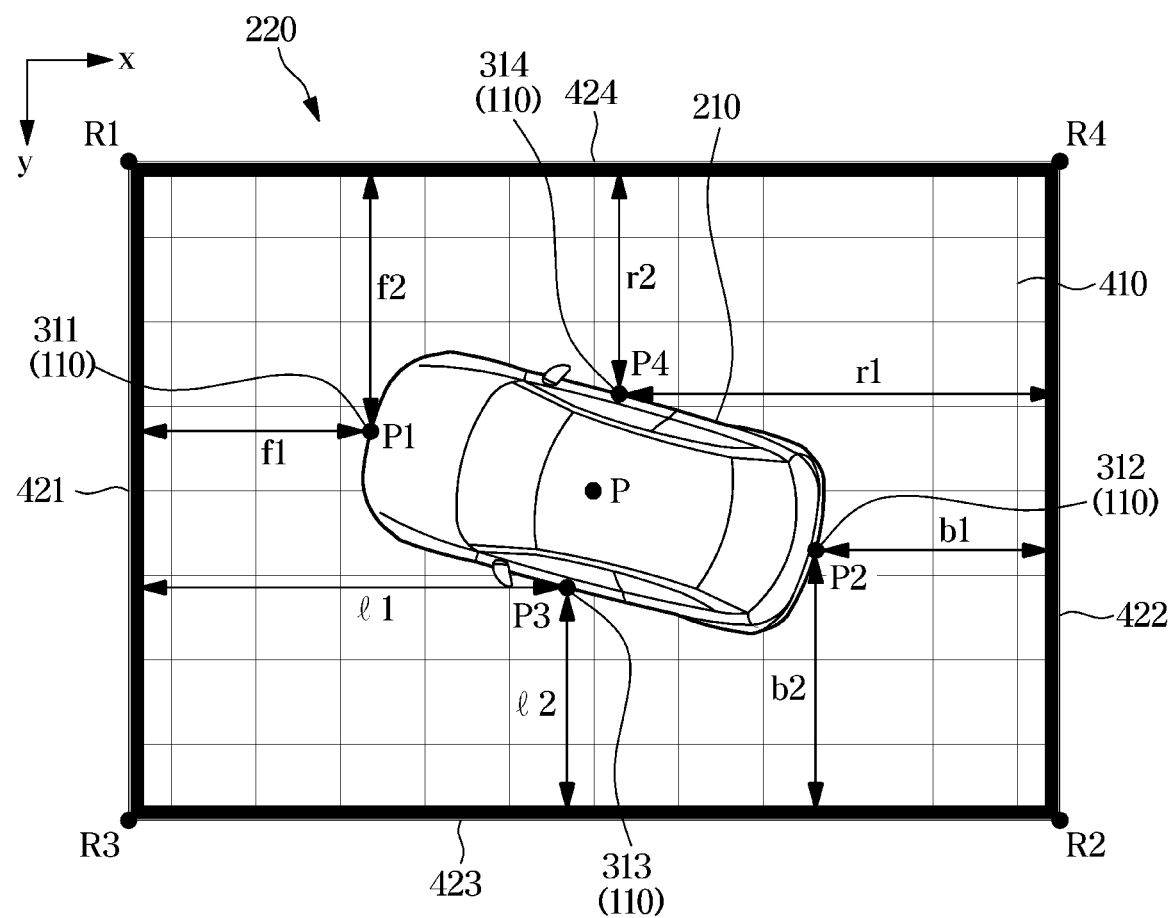
FIG. 4 is a view for describing another embodiment of determining the position coordinates of a vehicle positioned in an alighting infrastructure according to the present disclosure.

FIG. 4 is a view for describing another embodiment of determining the position coordinates of the vehicle 210 positioned in the alighting infrastructure 220 according to the present disclosure.

Referring to FIG. 4, the alighting infrastructure 220 according to the present disclosure includes a plurality of grid lines 410 for easily identifying the position coordinates of the vehicle 210, or the alighting infrastructure information stored in the controller 140 may include the plurality of grid lines 410.

Here, the plurality of grid lines 410 refer to lines for detecting a first component and a second component of coordinates in the alighting infrastructure 220. The first component of the coordinates may be, for example, an x coordinate, i.e., an x component, and the second component of the coordinates may refer to a y coordinate, i.e., a y component. However, the first and second components are not limited thereto.

When the alighting infrastructure information includes a plurality of grid lines 410 for detecting the first component and the second component of the coordinates in the alighting infrastructure, the controller 140 may compare the result of processing of the image data with the plurality of grid lines 410, extract a first distance between the vehicle 210 and the alighting infrastructure 220 corresponding to the first component and a second distance between the vehicle 210 and the alighting infrastructure 220 corresponding to the second component among distances resulting from processing the image data, and determine the position coordinates of the vehicle 210 using the first distance and the second distance.

For example, with respect to the first image sensor 110 disposed on the front part 311 of the vehicle 210, the controller 140 may extract a first distance f1 to the vehicle 210 that matches with the first component (e.g., the x component) of the plurality of grid lines 410 and a second distance f2 to the vehicle 210 that matches the second component (e.g., the y component) of the plurality of grid lines 410 among distances resulting from processing the image data. Then, the controller 140 determines the first coordinates P1 to be the position coordinates of the vehicle 210 using the first distance f1 and the second distance f2.

Here, the first distance f1 refers to the distance between the vehicle 210 and a first edge 421 of the alighting infrastructure 220, and the second distance f2 refers to the vehicle 210 and a fourth edge 424 of the alighting infrastructure 220. However, the first and second distances are not limited thereto.

For another example, with respect to the second image sensor 110 disposed on the rear part 312 of the vehicle 210, the controller 140 may extract a first distance b1 to the vehicle 210 that matches the first component (e.g., the x component) of the plurality of grid lines 410 and a second distance b2 to the vehicle 210 that matches the second component (e.g., the y component) of the plurality of grid lines 410 among distances resulting from processing the image data. Then, the controller 140 calculates the second coordinates P2 using the first distance b1 and the second distance b2.

Here, the first distance b1 refers to the distance between the vehicle 210 and a second edge 422 of the alighting infrastructure 220, and the second distance b2 refers to the vehicle 210 and a third edge 423 of the alighting infrastructure 220. However, the first and second distances are not limited thereto.

Similar to the above, the controller 140 may extract first distances 11 and r1 and second distances 12 and r2 using the third image sensor 110 and the fourth image sensor 110 disposed on the respective lateral sides of the vehicle 210, and calculate third coordinates P3 and fourth coordinates P4.

Here, the controller 140 calculates the center coordinates P of the vehicle 210 using the first coordinates P1, the second coordinates P2, the third coordinates P3, and the fourth coordinates P4 similar to described above with reference to FIG. 3, and determines the center coordinates P to be the position coordinates of the vehicle 210.

On the other hand, in order to more accurately determine the position coordinates of the vehicle 210, the alighting infrastructure information may include one or more coordinates indicating the position of a part, such as a corner, edge, and the like of the alighting infrastructure 220. That is, the alighting infrastructure information may include one or more reference coordinates indicating the position of a part of the alighting infrastructure 220. In this case, the controller 140 may determine the position coordinates of the vehicle 210 by reflecting a predetermined distance on the reference coordinates obtained from the alighting infrastructure information.

In detail, when the alighting infrastructure information includes one or more reference coordinates indicating a position of a part of the alighting infrastructure 220, the controller 140 may extract a first distance between the vehicle 210 and the alighting infrastructure 220 corresponding to a first direction and a second distance between the vehicle 210 and the alighting infrastructure 220 corresponding to a second direction perpendicular to the first direction among distances resulting from processing the image data, and may determine coordinates spaced apart from the reference coordinates by the first distance and the second distance to be the position coordinates of the vehicle 210.

For example, the alighting infrastructure information includes first corner coordinates R1 of the alighting infrastructure 220 as reference coordinates, and with respect to the first image sensor 110 disposed on the front part 311 of the vehicle 210, the controller 140 extracts a first distance f1 matching with a first direction corresponding to the x coordinate and a second distance f2 matching with a second direction corresponding to the y coordinate among distances resulting from processing the image data, and may determine coordinates spaced apart from the first corner coordinates R1 by the first distance f1 and the second distance f2 to be the position coordinates of the vehicle 210.

Here, the first distance f1 refers to the distance between the vehicle 210 and the first edge 421 of the alighting infrastructure 220, and the second distance f2 refers to the distance between the vehicle 210 and the fourth edge 414 of a lighting infrastructure 220, but the first and second distances f1 and f2 are not limited thereto.

For another example, the alighting infrastructure information includes second corner coordinates R2 of the alighting infrastructure 220 as reference coordinates, and with respect to the second image sensor 110 disposed on the rear part 312 of the vehicle 210, the controller 140 extracts a first distance b1 matching with a first direction corresponding to the x coordinate and a second distance b2 matching with a second direction corresponding to the y coordinate, similar to the above-described example, and determines coordinates spaced apart from the second corner coordinates R2 by the first distance b1 and the second distance b2 to be the position coordinates of the vehicle 210.

Here, the first distance b1 refers to the distance between the vehicle 210 and the second edge 422 of the alighting infrastructure 220, and the second distance b2 refers to the distance between the vehicle 210 and the third edge 423 of the alighting infrastructure 220, but the first and second distances are not limited thereto.

The above-described embodiment may be applicable to a case where a plurality of grid lines are marked on the alighting infrastructure 220.

On the other hand, similarly to the above, when the alighting infrastructure information includes third corner coordinates R3 and fourth corner coordinates R4 of the alighting infrastructure 220 as reference coordinates, the controller 140 may extract first distances 11 and r1 and second distances 12 and r2 using the third image sensor 110 and the fourth image sensor 110 disposed at the respective lateral sides 313 and 314 of the vehicle 210, and calculate third coordinates P3 and fourth coordinates P4.

Here, the controller 140 may calculate the center coordinates of the vehicle 210 using the first coordinates P1, the second coordinates P2, the third coordinates P3, and the fourth coordinates P4, as described above with reference to FIG. 3, and may determine the center coordinates to be the position coordinates of the vehicle 210.

Meanwhile, although the above-described embodiment has been described using the image sensor 110, the embodiment may be implemented in the same manner using the non-image sensor 120.

In addition, the above-described embodiment may be implemented in the same manner using a DCU having a combination of the processor 130 and the controller 140.

According to the present disclosure, when the position coordinates of the vehicle 210 in the alighting infrastructure 220 are determined and a travelling route is set based on the position coordinates of the vehicle 210, in order that the vehicle 210 travels along the set travelling route, an initial behavior for a first starting, such as a steering angle, a degree of acceleration, and the like, needs to be set.

The initial behavior when the vehicle 210 first starts travelling, in particular the steering angle, may be determined according to the type of stop of the vehicle 210 stopped in the alighting infrastructure 220.

Hereinafter, an embodiment of determining the type of stop of the vehicle will be described.

Figure 5:
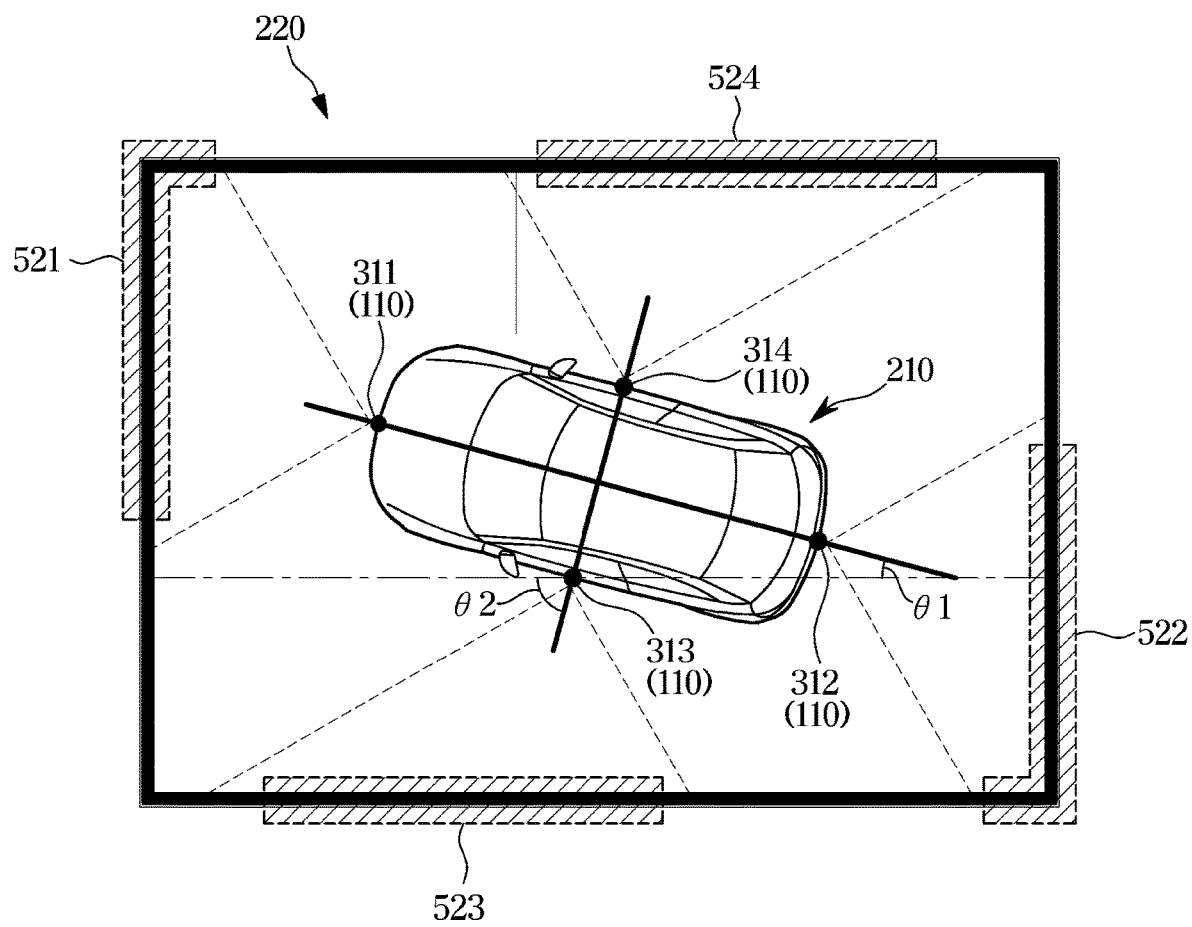
FIG. 5 is a view for describing an embodiment of determining a type of stop of a vehicle stopped in an alighting infrastructure according to the present disclosure.

FIG. 5 is a view for describing an embodiment of determining the type of stop of the vehicle 210 stopped in the alighting infrastructure 220 according to the present disclosure.

Referring to FIG. 5, the type of stop of the vehicle 210 according to the present disclosure may be determined based on a turning angle estimated using a detected edge of the alighting infrastructure 220, and the like.

In detail, the image sensor 110 may be provided in one or more units thereof on each of the front part 311, the rear part 312, and the lateral parts 313 and 314 of the vehicle 210 to have a respective field of view of a front side, a rear side, and lateral sides of the vehicle 210.

The alighting infrastructure information includes the shape of the alighting infrastructure 220 captured by the image sensor 110 with respect to the vehicle 210 positioned in the longitudinal direction, and the shape of the alighting infrastructure 220 captured by the image sensor 110 with respect to the vehicle 210 positioned in the transverse direction.

In addition, the controller 140 may estimate the turning angle of the vehicle 210 with respect to the alighting infrastructure 220 using a processing result of image data, which is obtained by capturing at least one of a front area 521, a rear area 522, and lateral areas 523 and 524 of the vehicle 210, and the shape of the alighting infrastructure 220.

Here, the turning angle may refer to an angle at which the vehicle 210 is displaced from one of the alighting infrastructure 220, the parking infrastructure 230, or the exit infrastructure 240.

For example, with respect to the first image sensor 110 disposed on the front part 311 of the vehicle 210, the controller 140 identifies the degree of distortion of the edge of the alighting infrastructure 220 by comparing the first sensing area 521 resulting from processing the image data with the shape of the alighting infrastructure 220 included in the alighting infrastructure information. The controller 140 performs image processing on the detected degree of distortion to estimate the turning angle of the vehicle 210 corresponding to the degree of distortion.

Then, the controller 140 may determine the type of stop as one of a longitudinal stop, a transverse stop, and an oblique stop according to the turning angle of the vehicle 210.

For example, when the turning angle is between 0 and a predetermined first reference angle, the controller 140 determines the type of stop to be the traverse stop (or longitudinal stop), and when the turning angle is in a range of the first reference angle and a predetermined second reference angle, the controller 140 determines the type of stop to be the oblique stop, and when the turning angle is in a range of the second reference angle and 90 degrees, the controller 140 determines the type of stop to be the longitudinal stop (or traverse stop).

When the turning angle and the type of stop are set as such, the controller 140 according to the present disclosure sets the initial behavior corresponding to the turning angle and the type of stop (i.e., the steering angle) such that the vehicle has a steering angle for first start travelling, and outputs a control signal corresponding to the steering angle to the actuator or the like.

Meanwhile, although the above-described embodiment has been described using the image sensor 110, the embodiment may be implemented in the same manner using the non-image sensor 120.

In addition, the above-described embodiment may be implemented in the same manner using a DCU having a combination of the processor 130 and the controller 140.

Figure 6:
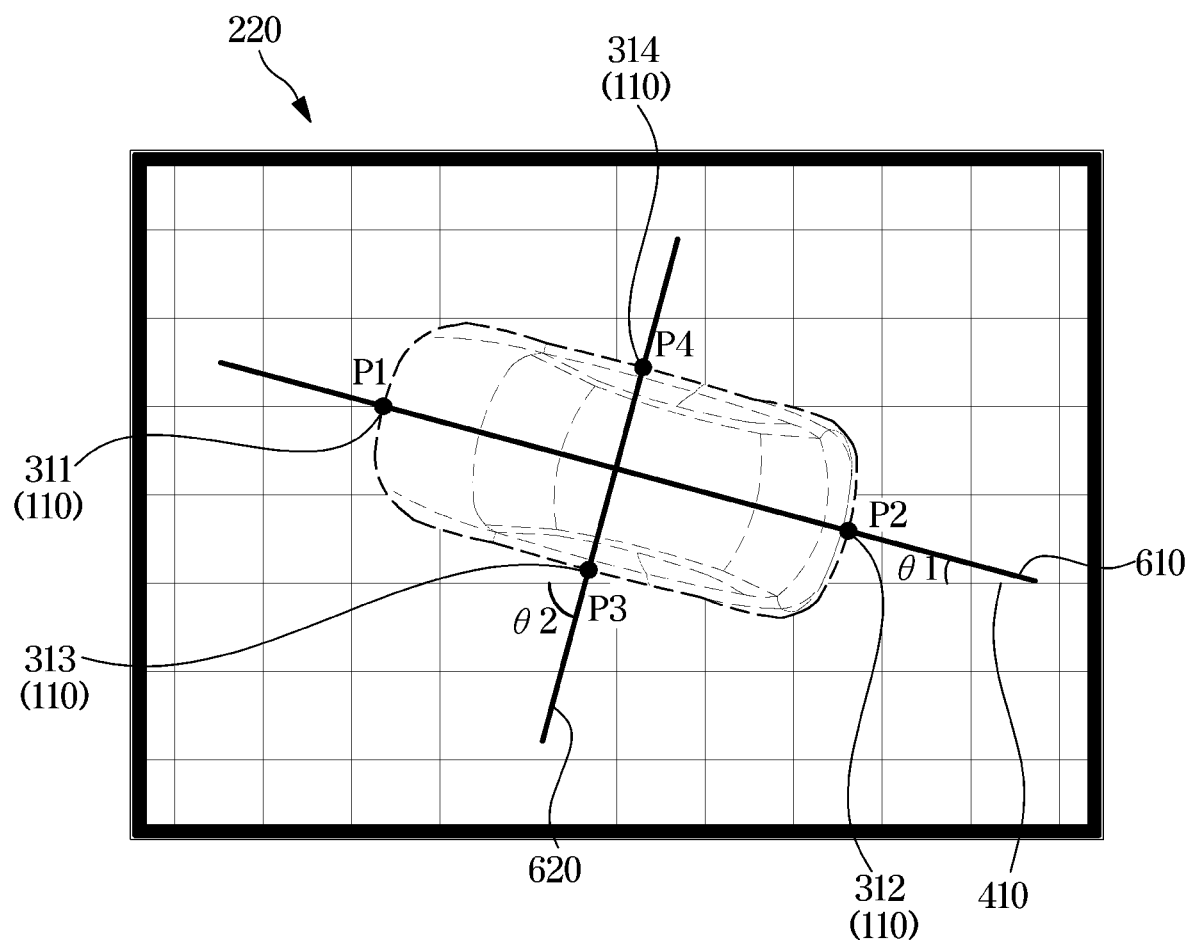
FIG. 6 is a view for describing another embodiment of determining a type of stop of a vehicle stopped in an alighting infrastructure according to the present disclosure.

FIG. 6 is a view for describing another embodiment of determining the type of stop of a vehicle stopped in an alighting infrastructure according to the present disclosure.

Referring to FIG. 6, the type of stop of the vehicle 210 according to the present disclosure may be determined based on a turning angle calculated using a detected edge of the alighting infrastructure 220, a plurality of grid lines, and the like.

That is, the image sensor 110 is provided in one or more units thereof on each of the front part 311, the rear part 312, and the lateral parts 313 and 314 of the vehicle 210 to have a respective field of view of a front side, a rear side, a first lateral side, and a second lateral side of the vehicle 210.

The alighting infrastructure information includes a plurality of grid lines 410 for detecting a first component and a second component of coordinates in the alighting infrastructure 220. The plurality of grid lines 410 are the same as described above with reference to FIG. 4.

The controller 140 may calculate a plurality of coordinates using a plurality of distances resulting from processing a plurality of pieces of image data obtained by capturing the front area, the rear area, and the respective lateral areas of the vehicle 210 and the plurality of grid lines.

The method of obtaining the plurality of grid lines is the same as that described above with reference to FIG. 4. For example, the controller 140 calculates the first coordinates P1 using the distance resulting from processing the first image data obtained by capturing the front area of the vehicle 210 and the plurality of grid lines, calculates the second coordinates P2 using the distance resulting from processing the second image data obtained by capturing the rear area of the vehicle 210 and the plurality of grid lines, calculates the third coordinates P3 using the distance resulting from processing the third image data obtained by capturing the first lateral area of the vehicle 210 and the plurality of grid lines, and calculates the fourth coordinates P4 using the distance resulting from processing the fourth image data obtained by capturing the second lateral area of the vehicle 210 and the plurality of grid lines.

Thereafter, the controller 140 may calculate the turning angle of the vehicle 210 with respect to the alighting infrastructure 220 on the basis of one of a first reference line 610 virtually connecting the first coordinates P1 corresponding to the front area to the second coordinates P2 corresponding to the rear area and a second reference line 620 virtually connecting the third coordinates P3 corresponding to the first lateral area to the fourth coordinates P4 corresponding to the second lateral area.

For example, the controller 140 calculates a first turning angle $\theta 1$ between the first reference line 610 that virtually connects the first coordinates P1 to the second coordinates P2 and one of the plurality of grid lines.

For another example, the controller 140 calculates a second turning angle $\theta 2$ between the second reference line 620 that virtually connects the third coordinates P3 to the fourth coordinates P4 and one of the plurality of grid lines.

Then, the type of stop may be determined to be one of a longitudinal stop, a transverse stop, and an oblique stop according to the turning angle of the vehicle 210.

For example, when the first turning angle θ1 (or the second turning angle θ2) is in a range of 0 to a predetermined first reference angle, the controller 140 determines the type of stop to be the traverse stop (or longitudinal stop), and when the first turning angle θ1 (or the second turning angle θ2) is in a range of the first reference angle to a predetermined second reference angle, the controller 140 determines the type of stop as the oblique stop, and when the first turning angle θ1 (or the second turning angle θ2) is in a range of the second reference angle to 90 degrees, the controller 140 determines the type of stop as the longitudinal stop (or traverse stop).

When the turning angle and the type of stop according thereto are determined, the controller 140 according to the present disclosure sets a steering angle corresponding to the turning angle and the type of stop to a steering angle for a start of the vehicle 210, and outputs a control signal corresponding to the set steering angle to the actuator.

Meanwhile, although the above-described embodiment has been described using the image sensor 110, the embodiment may be implemented in the same manner using the non-image sensor 120.

In addition, the above-described embodiment may be implemented in the same manner using a DCU having a combination of the processor 130 and the controller 140.

Figure 7:
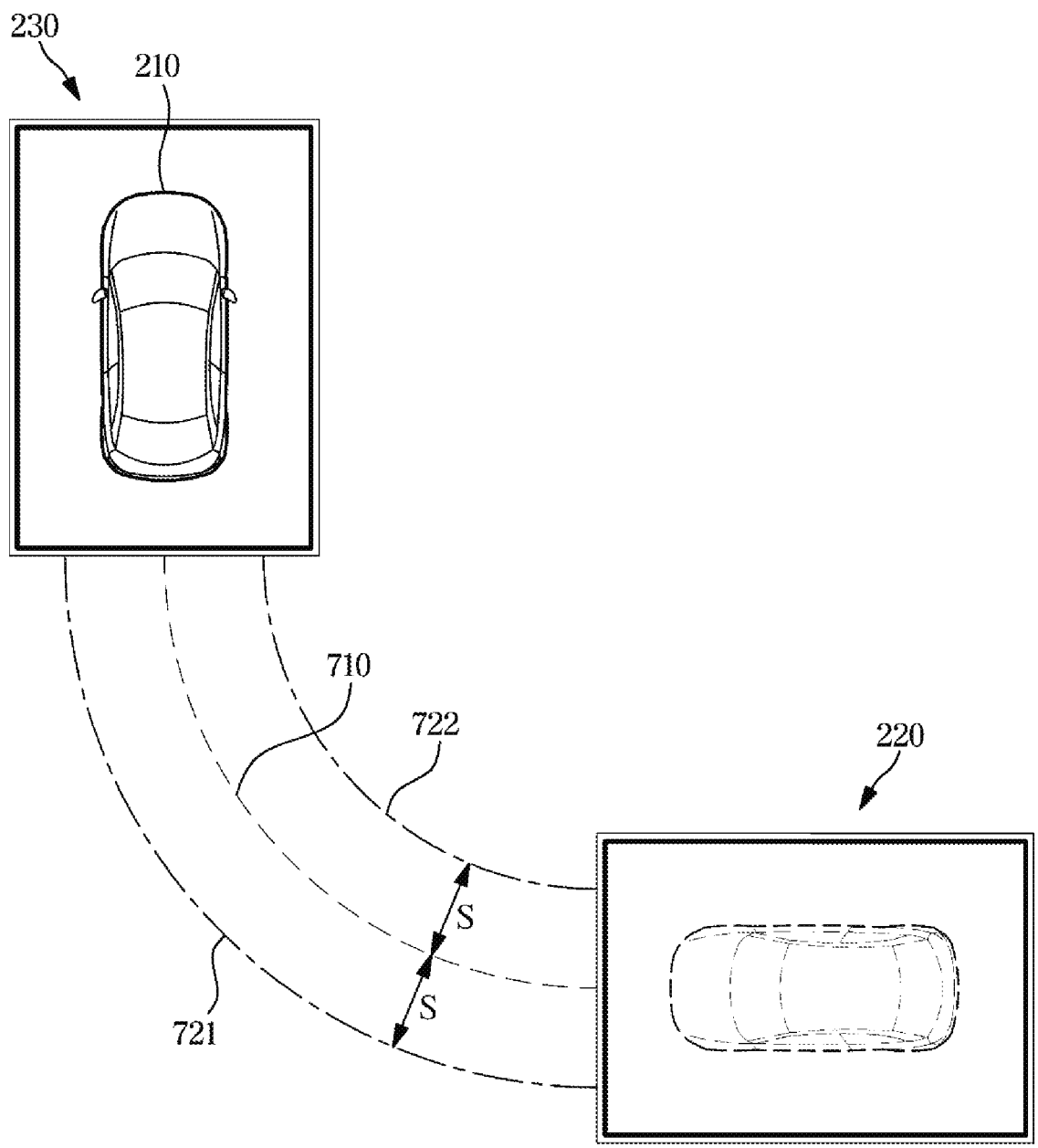
FIG. 7 is a view for describing an embodiment of setting a travelling route from an alighting infrastructure to a parking infrastructure according to the present disclosure.

FIG. 7 is a view for describing an embodiment of setting a travelling route from the alighting infrastructure 220 to the parking infrastructure 230 according to the present disclosure.

Referring to FIG. 7, the controller 140 according to the present disclosure may set a travelling route 710 using the position coordinates of the vehicle 210 in the alighting infrastructure 220 and the position coordinates of the parking infrastructure 230 obtained from previously stored parking infrastructure information.

Here, the controller 140 may set collision preventing boundary lines 721 and 722 spaced apart from the travelling route 710 by a predetermined safety distance s in the width direction of the travelling route 710.

For example, the controller 140 may set a first collision preventing boundary line 721 spaced apart from the travelling route 710 by the safety distance s in the first direction of the width of the travel route 710 and a second collision preventing boundary line 722 spaced apart from the travelling route 710 by the safety distance s in the second direction of the width of the travel route 710.

Here, the lengths, curvatures, or the like of the first collision preventing boundary line 721 and the second collision preventing boundary line 722 may be the same as or different from each other depending on the surrounding environment of the vehicle 210.

Thereafter, the controller 140 may control the behavior of the vehicle 210 to prevent the vehicle 210 traveling along the travelling route 710 from departing from the collision preventing boundary lines 721 and 722.

For example, when the vehicle 210 departs from the first collision preventing boundary line 721, the controller 140 may control the steering of the vehicle 210 such that the vehicle 210 turns right further and travels along the travelling route 710. However, the control of the vehicle 210 is not limited thereto.

Although not shown, since obstacles may exist on the travelling route 710, the controller 140 may set a local route based on a possibility of collision with the obstacles such that the vehicle 210 travels along the travelling route 710 while avoiding collision with the obstacles.

Meanwhile, although the above-described embodiment has been described using the image sensor 110, the embodiment may be implemented in the same manner using the non-image sensor 120.

In addition, the above-described embodiment may be implemented in the same manner using a DCU having a combination of the processor 130 and the controller 140.

Hereinafter, an embodiment of setting an exit route from the parking infrastructure 230 to the exit infrastructure 240 will be described.

Figure 8:
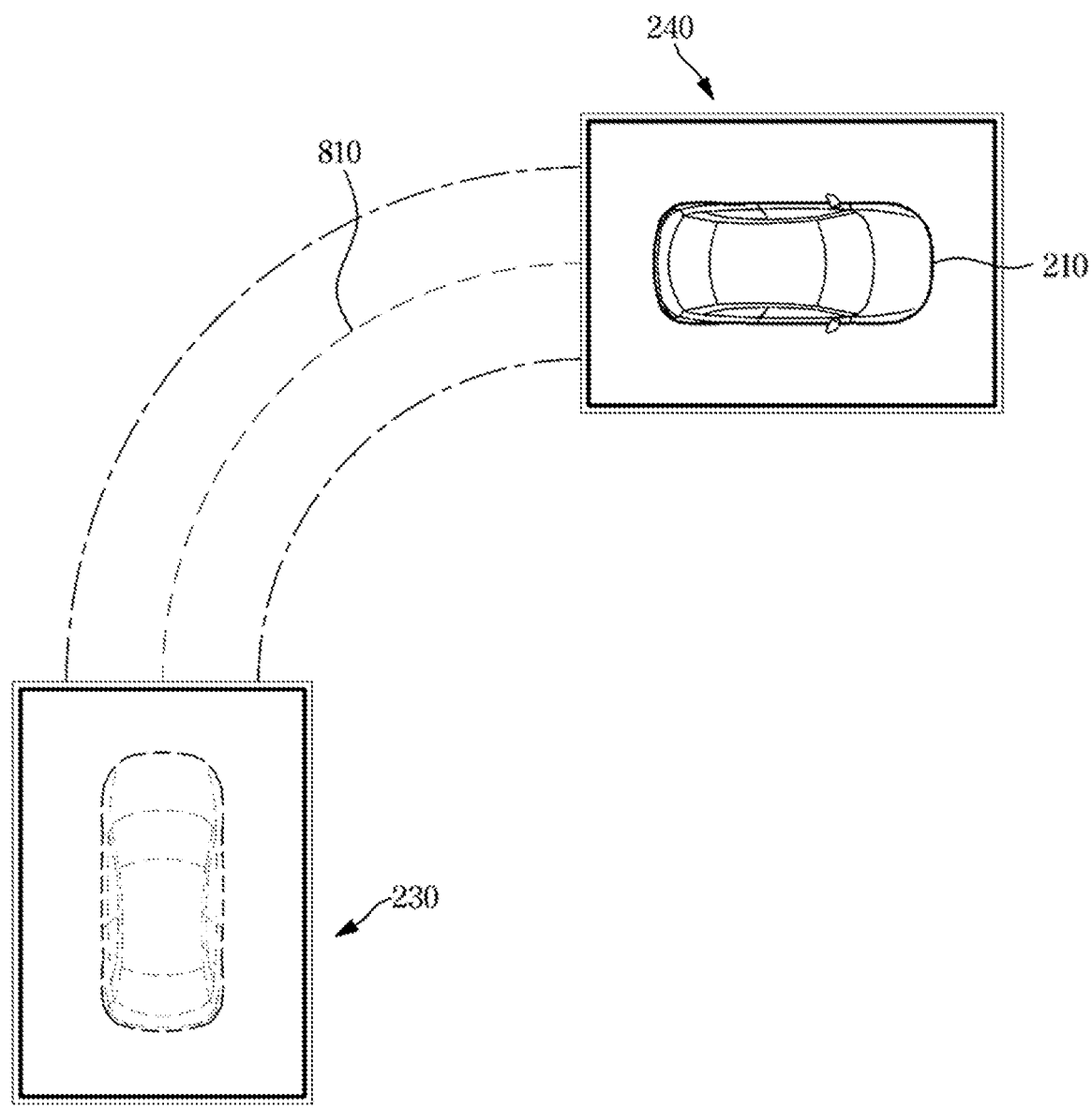
FIG. 8 is a view for describing an embodiment of setting an exit route from a parking infrastructure to an exit infrastructure according to the present disclosure.

FIG. 8 is a view for describing an embodiment of setting an exit route from the parking infrastructure 230 to the exit infrastructure 240 according to the present disclosure.

Referring to FIG. 8, the controller 140 according to the present disclosure previously stores exit infrastructure information about the exit infrastructure 240 as described above with reference to FIG. 2, and when parking of the vehicle is completed in the parking infrastructure 230, determines whether an exit command signal generated by a wireless communication terminal (not shown) is received.

Here, the exit infrastructure information refers to information about the exit infrastructure 230. Specifically, the exit infrastructure information may include a size and shape of the exit infrastructure 240, position coordinates of the exit infrastructure 240, and the like.

In response to receiving the exit command signal, the controller 140 may set an exit route 810 from the parking infrastructure 230 to the exit infrastructure 240.

In detail, the controller 140 may set the exit route 810 using the position coordinates of the vehicle 210 positioned in the parking infrastructure 230 and the position coordinates of the exit infrastructure 240 included in the previously stored exit infrastructure information.

The position coordinates of the vehicle 210 in the parking infrastructure 230 may be determined in the same manner as described above with reference to FIGS. 3 and 4, and although not shown, the position coordinates of the vehicle 210 may be adjusted in the parking infrastructure 230.

Although not shown, the controller 140 may set a plurality of collision preventing boundary lines spaced apart from the exit route 810 by a predetermined safety distance in both directions of the width of the exit route 810 similar to FIG. 7.

According to the present disclosure, when the position coordinates of the vehicle 220 in the parking infrastructure 230 are determined and the exit route 810 is set based on the position coordinates of the vehicle 220 in the parking infrastructure 230, the initial behavior of the vehicle 210 for the first start needs to be set similar to the above description. As described above, the initial behavior of the vehicle 210 for the first start may be determined according to the type of parking of the vehicle 220 parked in the parking infrastructure 230. The method of determining the type of parking may be implemented in the same manner as the method of determining the type of stop described above with reference to FIGS. 5 and 6.

Thereafter, the controller 140 may control the vehicle 210 parked in the parking infrastructure 230 to exit along the exit route 810.

Meanwhile, although the above-described embodiment has been described using the image sensor 110, the embodiment may be implemented in the same manner as the above-described embodiment using the non-image sensor 120.

In addition, the above-described embodiment may be implemented in the same manner using a DCU having a combination of the processor 130 and the controller 140.

Hereinafter, a vehicle control method capable of performing the present disclosure will be described.

FIG. 9 is a flowchart showing a vehicle control method according to the present disclosure.

Referring to FIG. 9, the vehicle control method according to the present disclosure may include capturing image data using one or more image sensors 110 disposed on the vehicle to have a field of view of the outside of the vehicle (S910), processing the image data captured by the image sensor 110 (S920), setting a travelling route from the alighting infrastructure to the parking infrastructure based at least in part on the processing of the image data, and controlling the vehicle stopped in the alighting infrastructure to travel along the travelling route and to be parked in the parking infrastructure (S930).

The vehicle control method according to the present disclosure may further include determining whether the vehicle 210 is parked in the parking infrastructure 230 (S940). That is, when parking is not completed, the operation S930 is performed, and when parking is completed, the operation ends.

Here, the operation S920 of processing the image data captured by the image sensor 110 may be the same as the operation of the processor 130 described above.

Here, the operation S930 of controlling the vehicle to be parked in the parking infrastructure may be performed in the same manner as the operation of the controller 140 described above.

That is, the operation S930 of controlling of the vehicle to be parked in the parking infrastructure may include determining the position coordinates and the type of stop of the vehicle in the alighting infrastructure based on the processing result of the image data and the previously stored alighting infrastructure information, extracting the position coordinates of the parking infrastructure based on the previously stored parking infrastructure information, setting the travelling route using the position coordinates of the vehicle and the position coordinates of the parking infrastructure, and determining an initial behavior of the stopped vehicle for a start based on the type of stop of the vehicle.

As described above, the present disclosure provides the vehicle control system and the vehicle control method capable of providing a driver with a convenience of driving by controlling the vehicle to be autonomously parked.

In addition, the present disclosure provides the vehicle control system and the vehicle control method capable of setting a travelling route that enables accurate parking in a parking zone and a vehicle exit route that enables accurately arrival at an exit zone.

The above description of the present disclosure is for illustrative purposes, and a person having ordinary skilled in the art should appreciate that other specific modifications may be easily made without departing from the technical spirit or essential features of the present disclosure. Therefore, the above embodiments should be regarded as illustrative rather than limitative in all aspects. For example, suitable results may be achieved even when the described techniques are performed in a different order and/or components in a described system, structure, apparatus, circuit and the like are combined in a different manner and/or replaced or supplemented by other components or their equivalents. Within the objective scope of the present disclosure, the respective components may be selectively and operatively combined in any numbers. The scope of the disclosure is not to be limited by the detailed description set forth above, but by the accompanying claims of the present disclosure, and it should also be understood that all changes or modifications derived from the definitions and scope of the claims and their equivalents fall within the scope of the present disclosure.

What is claimed is:

1. A vehicle control system comprising:
one or more image sensors disposed on a vehicle to have a field of view of an outside the vehicle and configured to capture image data;
a processor configured to process the image data captured by the image sensor; and
a controller configured to set a travelling route from an alighting infrastructure to a parking infrastructure based at least in part on processing of the image data, and control the vehicle stopped in the alighting infrastructure to travel along the travelling route and to be parked in the parking infrastructure,
wherein the alighting infrastructure is defined at previously stored alighting infrastructure information,
wherein the controller is configured to:
  determine position coordinates of the vehicle and a stop type of the vehicle in the alighting infrastructure based on a result of the processing of the image data and the alighting infrastructure information;
  extract position coordinates of the parking infrastructure based on previously stored parking infrastructure information;
  set the travelling route using the position coordinates of the vehicle and the position coordinates of the parking infrastructure; and
  determine an initial behavior for a start of a stopped vehicle based on the stop type of the vehicle,
wherein the alighting infrastructure information includes
  a plurality of grid lines for detecting a first component and a second component of coordinates in the alighting infrastructure, and
  a size and a shape of the alighting infrastructure, and
wherein the controller is configured to:
  compare the result of processing of the image data with the plurality of grid lines;
  extract a first distance between the vehicle and the alighting infrastructure corresponding to the first component and a second distance between the vehicle and the alighting infrastructure corresponding to the second component among distances resulting from processing the image data; and
  determine the position coordinates of the vehicle and the stop type of the vehicle in the alighting infrastructure using the first distance, the second distance, and the size and shape of the alighting infrastructure.

2. The vehicle control system of claim 1,
wherein the image sensor is provided in one or more units thereof on each of a front part, a rear part, and a lateral part of the vehicle to have a respective field of view of a front side, a rear side, and a lateral side of the vehicle,
wherein the controller is configured to:
  estimate a plurality of coordinates using results of processing of a plurality of pieces of image data obtained by capturing a front area, a rear area, and a lateral area of the vehicle and the size and shape of the alighting infrastructure, and
  calculate center coordinates of the vehicle using the estimated plurality of coordinates and determine the center coordinates to be the position coordinates of the vehicle.

3. The vehicle control system of claim 1,
wherein the alighting infrastructure information includes one or more reference coordinates indicating a position of a part of the alighting infrastructure,
wherein the controller is configured to:
extract a first distance between the vehicle and the alighting infrastructure corresponding to a first direction and a second distance between the vehicle and the alighting infrastructure corresponding to a second direction perpendicular to the first direction among distances resulting from processing the image data; and
determine coordinates spaced apart from the reference coordinates by the first distance and the second distance to be the position coordinates of the vehicle.

4. The vehicle control system of claim 1,
wherein the image sensor is provided in one or more units thereof on each of a front part, a rear part, and a lateral part of the vehicle to have a respective field of view of a front side, a rear side, and a lateral side of the vehicle,
wherein the alighting infrastructure information includes a shape of the alighting infrastructure,
wherein the controller is configured to:
estimate a turning angle of the vehicle with respect to the alighting infrastructure using results of processing of a plurality of pieces of image data obtained by capturing at least one of a front area, a rear area, and a lateral area of the vehicle and the shape of the alighting infrastructure, and
determine the stop type of the vehicle to be one of a longitudinal stop, a traverse stop, and an oblique stop based on the turning angle.

5. The vehicle control system of claim 1,
wherein the image sensor is provided in one or more units thereof on each of a front part, a rear part, and a lateral part of the vehicle to have a respective field of view of a front side, a rear side, a first lateral side, and a second lateral side of the vehicle, and
wherein the controller is configured to:
calculate a plurality of coordinates using a plurality of distances resulting from processing a plurality of pieces of image data obtained by capturing a front area, a rear area, and a lateral area of the vehicle, respectively, and the plurality of grid lines;
calculate a turning angle of the vehicle with respect to the alighting infrastructure based on one of a first reference line virtually connecting first coordinates corresponding to the front area to second coordinates corresponding to the rear area and a second reference line virtually connecting third coordinates corresponding to a first lateral area and fourth coordinates corresponding to a second lateral area, and
determine the stop type of the vehicle to be one of a longitudinal stop, a traverse stop, and an oblique stop based on the turning angle of the vehicle.

6. The vehicle control system of claim 1, wherein the controller controls the vehicle to travel along the travelling route in response to receiving a travel command signal from a wireless communication terminal.

7. The vehicle control system of claim 1, wherein the controller sets a local route based on a possibility of collision with an obstacle while driving the vehicle along the travelling route.

8. The vehicle control system of claim 1, wherein the controller stores exit infrastructure information about an exit infrastructure in advance,
wherein the controller is configured to:
in response to completion of parking of the vehicle in the parking infrastructure, determine whether an exit command signal generated by a wireless communication terminal is received;
in response to receiving the exit command signal, set an exit route from the parking infrastructure to the exit infrastructure; and
control the vehicle parked in the parking infrastructure to exit along the exit route.

9. The vehicle control system of claim 1, wherein the controller is configured to:
set a plurality of collision prevention boundary lines spaced apart from the travelling route by a predetermined safety distance in a width direction of the travelling route; and
control a behavior of the vehicle to prevent the vehicle travelling along the travelling from departing from the plurality of collision prevention boundary lines.

10. The vehicle control system of claim 1, further comprising at least one non-image sensor disposed on the vehicle to have a field of sensing of an outside of the vehicle and configured to capture sensing data,
wherein the processor is configured to process the sensing data captured by the non-image sensor; and
the controller is configured to determine position coordinates of the vehicle and a stop type of the vehicle based on results of processing of the image data and the sensing data.

11. A vehicle control system comprising:
one or more image sensors disposed on a vehicle to have a field of view of an outside of the vehicle and configured to capture image data;
a smart parking assist system (SPAS) module configured to search a parking space existing around the vehicle and controlling a behavior of the vehicle such that the vehicle is parked in the parking space or the vehicle parked in the parking space is unparked; and
a domain control unit (DCU) configured to process the image data captured by the image sensor and control at least one driver assistance system provided in the vehicle and including the SPAS module,
wherein the alighting infrastructure is defined at previously stored alighting infrastructure information,
wherein the DCU is configured to:
determine position coordinates of the vehicle and a stop type of the vehicle in an alighting infrastructure based on a result of processing of the image data and the alighting infrastructure information;
extract position coordinates of a parking infrastructure based on previously stored parking infrastructure information;
set a travelling route using the position coordinates of the vehicle and the position coordinates of the parking infrastructure; and
determine an initial behavior for a start of a stopped vehicle based on the stop type of the vehicle,
wherein the alighting infrastructure information includes:
a plurality of grid lines for detecting a first component and a second component of coordinates in the alighting infrastructure, and
a size and a shape of the alighting infrastructure, and
wherein the controller is configured to:
compare the result of processing of the image data with the plurality of grid lines;
extract a first distance between the vehicle and the alighting infrastructure corresponding to the first component and a second distance between the vehicle and the alighting infrastructure corresponding to the second component among distances resulting from processing the image data; and determine the position coordinates of the vehicle and the stop type of the vehicle in the alighting infrastructure using the first distance the second distance, and the size and shape of the alighting infrastructure.

12. The vehicle control system of claim 11, wherein the image sensor is provided in one or more units thereof on a front part, a rear part, a first lateral part, and a second lateral part of the vehicle to have a respective field of view of a front side, a rear side, a first lateral side, and a second lateral side of the vehicle, and wherein the controller is configured to:

estimate a plurality of coordinates using results of processing of a plurality of pieces of image data obtained by capturing a front area, a rear area, and a lateral area of the vehicle, respectively, and the size and shape of the alighting infrastructure, and calculate center coordinates of the vehicle using the estimated plurality of coordinates and determine the calculated center coordinates to be the position coordinates of the vehicle.

13. The vehicle control system of claim 11, wherein the alighting infrastructure information includes one or more reference coordinates indicating a position of a part of the alighting infrastructure, wherein the DCU is configured to:

extract a first distance between the vehicle and the alighting infrastructure corresponding to a first direction and a second distance between the vehicle and the alighting infrastructure corresponding to a second direction perpendicular to the first direction among distances resulting from processing the image data; and determine coordinates spaced apart from the reference coordinates by the first distance and the second distance to be the position coordinates of the vehicle.

14. The vehicle control system of claim 11, wherein the image sensor is provided in one or more units thereof on each of a front part, a rear part, a first lateral part, and a second lateral side of the vehicle to have a respective field of view of a front side, a rear side, a first lateral side, and a second lateral side of the vehicle, wherein the DCU is configured to:

calculate a plurality of coordinates using a plurality of distances resulting from processing a plurality of pieces of image data obtained by capturing a front area, a rear area, and a lateral area of the vehicle, respectively, and the plurality of grid lines;

calculate a turning angle of the vehicle with respect to the alighting infrastructure based on one of a first reference line virtually connecting first coordinates corresponding to the front area to second coordinates corresponding to the rear area and a second reference line virtually connecting third coordinates corresponding to a first lateral area and fourth coordinates corresponding to a second lateral area; and determine the stop type of the vehicle to be one of a longitudinal stop, a travers stop, and an oblique stop based on the turning angle of the vehicle.

15. The vehicle control system of claim 11, further comprising at least one non-image sensor disposed on the vehicle to have a field of sensing of an outside of the vehicle and configured to capture sensing data, wherein the controller is configured to determine position coordinates of the vehicle and a stop type of the vehicle based on results of processing of the image data and the sensing data.

16. A vehicle control method comprising:

capturing image data using one or more image sensor disposed on a vehicle to have a field of view of an outside of the vehicle;

processing the image data captured by the image sensor; and setting a travelling route from an alighting infrastructure to a parking infrastructure based at least in part on processing of the image data, and controlling the vehicle stopped in the alighting infrastructure to travel along the travelling route and to be parked in the parking infrastructure, wherein the alighting infrastructure is defined at previously stored alighting infrastructure information, wherein the controlling of the vehicle to be parked in the parking infrastructure includes:

determining position coordinates of the vehicle and a stop type of the vehicle in the alighting infrastructure based on a result of processing of the image data and previously stored alighting infrastructure information;

extracting position coordinates of the parking infrastructure based on previously stored parking infrastructure;

setting the travelling route using the position coordinates of the vehicle and the position coordinates of the parking infrastructure; and determining an initial behavior for a start of the stopped vehicle based on the stop type of the vehicle, wherein the alighting infrastructure information includes:

a plurality of grid lines for detecting a first component and a second component of coordinates in the alighting infrastructure, and a size and a shape of the alighting infrastructure, and wherein the controlling of the vehicle to be parked in the parking infrastructure includes:

comparing the result of processing of the image data with the plurality of grid lines;

extracting a first distance between the vehicle and the alighting infrastructure corresponding to the first component and a second distance between the vehicle and the alighting infrastructure corresponding to the second component among distances resulting from processing the image data; and determine the position coordinates of the vehicle and the stop type of the vehicle in the alighting infrastructure using the first distance the second distance, and the size and shape of the alighting infrastructure.

* * * * *